United States Patent [19]
Krigmont et al.

[11] Patent Number: 5,122,162
[45] Date of Patent: Jun. 16, 1992

[54] CONTROL SYSTEM FOR FLUE GAS CONDITIONING

[75] Inventors: Henry V. Krigmont, Seal Beach; Everett L. Coe, Jr., Downey; Daniel A. Hebert, Irvine; Wayne R. Kozacka, Laguna Hills, all of Calif.

[73] Assignee: Wahlco, Inc., Santa Ana, Calif.

[21] Appl. No.: 496,873

[22] Filed: Mar. 19, 1990

[51] Int. Cl.$^5$ .............................................. B03C 3/66
[52] U.S. Cl. ............................................. 55/5; 55/106
[58] Field of Search ........................................ 55/5, 106

[56] References Cited

U.S. PATENT DOCUMENTS

| | | | |
|---|---|---|---|
| 4,779,207 | 10/1988 | Woracek et al. | 55/5 |
| 4,872,887 | 10/1989 | Altman et al. | 55/5 |
| 4,987,839 | 1/1991 | Krigmont et al. | 55/5 |

FOREIGN PATENT DOCUMENTS

567496  8/1977  U.S.S.R. .................. 55/5

Primary Examiner—Bernard Nozick
Attorney, Agent, or Firm—Howard E. Sandler

[57] ABSTRACT

The volumetric flow rate for the addition of a flue gas conditioning agent, such as sulfur trioxide, is established by maintaining the derivative of the electrostatic precipitator power with respect to flow rate within a preselected operating range. The derivative of the precipitator power with respect to time and the derivative of the flow rate with respect to time are measured, and then the derivatives are divided to determine the derivative of precipitator power with respect to flow rate. This calculated value is compared with a preselected operating range. If the calculated value is greater than the preselected operating range, the flow rate of the conditioning agent is increased. If the calculated value is less than the preselected operating range, the flow rate is reduced, until a steady state calculated derivative value within the operating range is reached.

5 Claims, 5 Drawing Sheets

CONTROL SYSTEM FOR FLUE GAS CONDITIONING

BACKGROUND OF THE INVENTION

This invention relates to the control of particulate matter in flue gases, and, more particularly, to a control system for the addition of conditioning agents to the flue gas.

In a coal-fired power plant, coal is burned to heat air, which in turn boils water to form steam. The steam drives a turbine and thence an electric generator, producing electricity. Besides heat, the burning of the coal produces gaseous pollutants such as sulfur and nitrogen oxides, and a solid particulate known as fly ash. Environmental protection laws mandate that the amounts of gaseous pollutants and solid particulate emitted from the power plant be maintained at acceptably low levels, and the present invention deals generally with the technology for controlling particulate emissions.

One widely used approach for removing the particulate fly ash from combustion or flue gas streams is electrostatic precipitation. The flue gas stream with entrained particulate is passed between electrically energized electrodes that charge the particles so that they are attracted to, and deposited upon, a collection electrode. The particulate may optionally be charged prior to entry into the precipitator to increase the efficiency of removal. The cleaned combustion gases are released to the atmosphere, and the precipitated particulate is removed from the collection electrode.

The efficiency of operation of electrostatic precipitators depends markedly upon the electrical resistivity of the particulate. If the resistivity is too high, a collection current cannot be induced to flow between the electrodes of the precipitator, so that the ability to collect particulate is reduced, sometimes severely so. There exist conditioning procedures and apparatus for altering the conductivity of the particulate by injection of conditioning agents into the combustion gas stream prior to its entering the electrostatic precipitator.

An example of such a conditioning procedure is that disclosed in U.S. Pat. No. 3,993,429, and this approach has become widely accepted and used throughout the United States and the world. In this approach, a conditioning gas such as sulfur trioxide is injected into the combustion gas stream. The sulfur trioxide conditioning gas reacts with water vapor in the gas stream to produce sulfuric acid that is deposited upon the surface of the particulate. The sulfuric acid reduces the electrical resistance of the particulate, which is equivalent to raising the electrical conductivity of the fly ash particulate, so that the electrostatic precipitation treatment works well. Conditioning treatments are routinely used where the sulfur content of the coal burned in the power plant is so low that the electrical resistivity of the resulting particulate is too high to permit the electrostatic precipitators to operate with optimum collection rates.

The amount of conditioning agent added to the flue gas should be selected to optimize the precipitator performance. At the present time, the control procedures are performed manually, based upon the observations of the operator, or by a feedback control based upon maintaining a particular value of the power consumption of the electrostatic precipitator. Neither of these approaches works in a fully satisfactory manner, the former because of its lack of reproducibility and the latter because the functional performance of the electrostatic precipitator depends upon a variety of factors which are not reflected in a single power consumption figure. There exists a need for an improved approach to controlling the addition of conditioning agent to the stream of flue gas, so that the adjustments may be done automatically and reproducibly. The present invention fulfills this need, and further provides related advantages.

SUMMARY OF THE INVENTION

The present invention provides a method and apparatus for controlling the addition of conditioning agent to flue gas streams containing particulate matter. The approach utilizes measurements of system performance as the basis for feedback control of the conditioning agent flow rate. It requires no operator input, and therefore is not affected by variations in operator judgment. Using the invention, a proper amount of conditioning agent may be added to reach and maintain optimum or near-optimum electrostatic precipitator performance.

In accordance with the invention, a method for controlling the flow rate of a conditioning agent in a flue gas conditioning operation comprises the steps of providing a stream of flue gas to an electrostatic precipitator, with a conditioning agent being added to the flue gas before it enters the electrostatic precipitator; establishing a flow rate F of the conditioning agent into the flue gas as a function of time; measuring the electrostatic precipitator power consumption P as a function of time; and controlling the flow rate of the conditioning agent such that the first derivative of the power consumption as a function of the flow rate of the conditioning agent, $dP/dF$, is within a preselected operating range. (As used herein, the flow rate F is expressed relative to the flow rate of the flue gas, and is typically in parts per million by volume. Thus, to determine the mass flow rate of the conditioning agent, as in pounds per unit time, it is necessary to multiply F by the flow rate of the flue gas.)

The invention also extends to an apparatus used to control the flow of the conditioning agent. In accordance with this aspect of the invention, apparatus for controlling the flow rate of a conditioning agent added into a stream of a flue gas that is subsequently subjected to electrostatic precipitation to remove particulate matter from the flue gas comprises means for measuring the power consumption of the electrostatic precipitator P as a function of time; means for determining the flow rate of the conditioning agent F as a function of time; and means for controlling the flow rate of the conditioning agent such that the derivative of the power consumption P as a function of the flow rate of the conditioning agent F is within a preselected operating range greater than zero.

Power consumption P of the electrostatic precipitator is a good measure of the effectiveness of the conditioning process. The power consumption is dependent upon the amount of particulate matter being deposited upon the collection plates. Where the power consumption is low, few particles are deposited. Maximum power consumption results from a large voltage charging particles and electrical current carried through the deposited particles to the collector electrode, and thence capture of a large fraction of the particulate matter in the flue gas.

For combustion conditions resulting in insufficient electrical conductivity of the particulate matter in the flue gas stream to achieve collection in the precipitator, two possible functional variations have been observed in actual power plants for the power consumption of the electrostatic precipitator as a function of the flow rate of a conditioning agent such as sulfur trioxide. In both cases, the power consumption rises as small and increasing amounts of the conditioning agent are added per unit time. As the power consumption rises further, there are two possible relationships, depending upon the precipitator design, flow rates of flue gas, and character of the coal and thence the particulate matter. In one type of behavior, the power consumption reaches a maximum and then decreases with increasing flow of conditioning agent. In the other type of behavior, the power consumption continuously and gradually increases with increasing flow of conditioning agent.

It is not always possible to know beforehand which characteristic will be observed in any set of operating conditions. The present invention utilizes the slope of the functional relationship as the basis for control of the conditioning agent flow rate. At flow rates of conditioning agent near or just below the possible branching point, the slope is always positive. A preselected value of the slope, termed the operating range, is selected as the control point, and the flow rate of the conditioning agent is adjusted to maintain the slope within the operating range. If the measured slope is less than the operating range, the flow rate of conditioning agent is decreased. If the measured slope is greater than the operating range, the flow rate of conditioning agent is increased.

In some cases it is observed that there is a measurable lag time, of as much as several hours, from the making of the adjustment in the flow rate of conditioning agent until the result is observed in a change in power consumption and derivative of the power consumption-flow rate curve. The present approach permits a lag time to be incorporated into the analysis, so that the "derivative" is based upon a presently measured power consumption but a previously altered flow rate of conditioning agent.

The present invention provides a reproducible approach for automatically controlling the flow rate of the conditioning agent to achieve near-optimal operation of the electrostatic precipitator. The approach provides a control system and method that is operable with existing precipitators and conditioning apparatus. Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
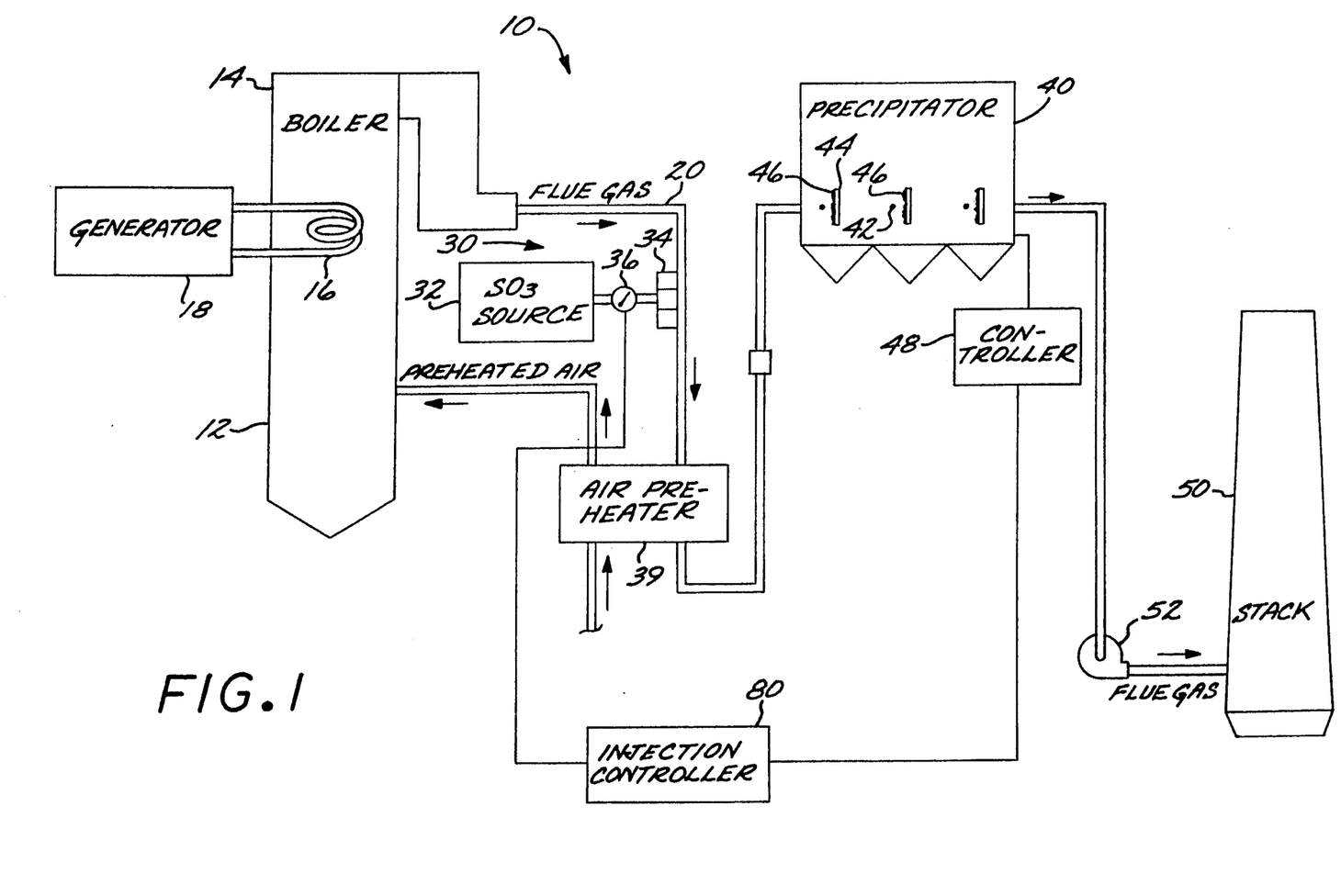
FIG. 1 is a schematic drawing of a flue gas conditioning system.

The present invention is preferably used in conjunction with an apparatus 10 for precipitating particulate from a combustion gas stream, which is depicted in FIG. 1. In a conventional coal-fired power plant, coal is burned by a combustor 12, and the resulting hot flue or combustion gas is passed through a boiler 14, where it heats and boils water. The resulting steam in a loop 16 flows to a turbine/generator set 18, where electricity for consumption is produced. The steam is condensed, and the water flows back through the loop 16.

The flue gas stream leaving the boiler 14, indicated by numeral 20, cannot normally be exhausted directly to the atmosphere, because it contains the particulate or fly ash resulting from the combustion 12. If it were exhausted to the atmosphere, the fly ash would contaminate the environment. Fortunately, the fly ash can be removed from the flue gas stream 20 by electrostatic precipitator technology, if the fly ash has an acceptable electrical resistivity.

The fly ash produced by some types of coal, particularly coal containing a low sulfur content, has too high an electrical resistance to be processed in an electrostatic precipitator, and therefore must be conditioned before entering the precipitator. It is known to inject a conditioning agent into the combustion gas stream by a conditioning apparatus 30, illustrated schematically in FIG. 1.

The conditioning apparatus 30 injects a conditioning agent (that may be a gas, a liquid, or a solid, but is preferably a gas) into the flue gas stream 20. The conditioning agent is preferably sulfur trioxide, but may be, for example, other gaseous oxides of sulfur, ammonia, or water vapor. The preferred apparatus 30 therefore includes a source 32 of the conditioning gas, and a plurality of injector nozzles 34 that extend into the flue gas stream 20 to inject the conditioning gas directly into the stream 20. A valve 36, or other flow control device, meters the conditioning gas into the combustion gas stream 20 through the nozzles 34 at a volumetric or mass flow rate. A preferred source 32 is disclosed in U.S. Pat. No. 3,993,429, and a preferred construction of the nozzles 34 is disclosed in U.S. Pat. No. 4,179,071. The disclosures of both of these patents are incorporated herein by reference.

In the illustration of FIG. 1, the injector nozzles 34 are shown as injecting the conditioning agent at a location upstream (on the hot side) of a preheater 39. The injector nozzles 34 may also be located downstream (on the cold side) of the preheater 39. The injector nozzles 34 must, however, be upstream of the precipitator, so that the conditioning agent is injected into the gas stream before it is processed by the precipitator.

The injected conditioning gas molecules react with the particulate in the gas stream to modify the conductivity of the particulate, or, alternatively stated, to adjust its resistivity. In the case of the preferred sulfur trioxide conditioning gas, the conditioning gas reacts with the residual moisture (water vapor) in the flue gas to form sulfuric acid on the surface of the particulate, which increases the electrical conductivity of the particulate.

Either before or after conditioning, the combustion gas stream 20 of flue gas flows through the preheater 39 which cools the stream 20 of flue gas by heating the stream of incoming air flowing to the combustor 12, and then to an electrostatic precipitator 40. The precipitator 40 may be of any of the many types commercially available and known in the art. The precipitator 40 includes a plurality of electrodes 42 charged with a high voltage, and grounded collector plates 44. The particulate in the gas stream 20 is charged by the electrostatic field established between the electrodes 42 and the plates 44, and is attracted to be deposited as a layer 46 upon the plates 44 for subsequent removal. The operation of the electrostatic precipitator 40 to effect removal of particulate from the gas stream, including the voltage and current applied to the electrodes 42, the rapping of the plates 44 to cause the collected particulate to fall into hoppers, and auxiliary control and display functions are under the control of an electrostatic precipitator controller 48.

The gas stream that leaves the electrostatic precipitator 40 is forced up an exhaust stack 50 by a blower 52, and thence into the atmosphere.

Figure 2:
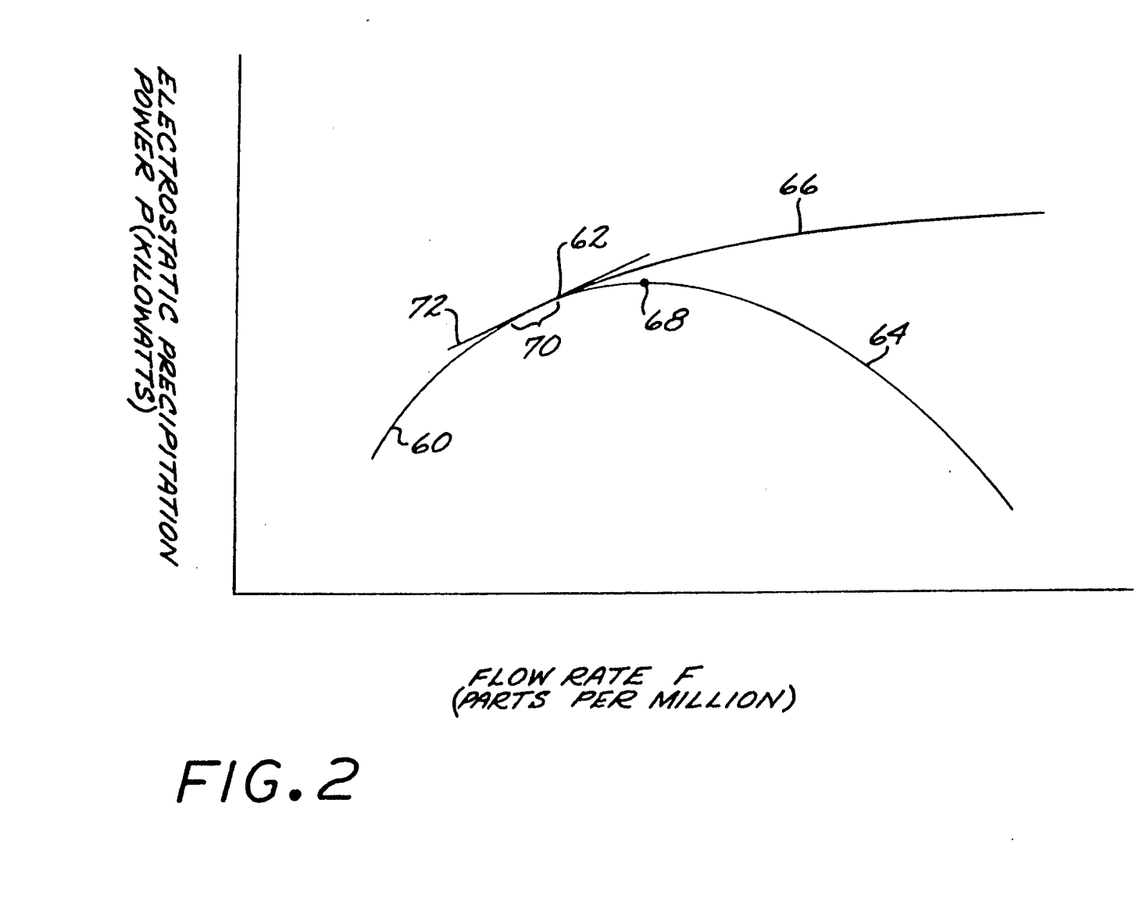
FIG. 2 is a schematic graph of electrostatic precipitator power consumption as a function of conditioning agent flow rate.

The present invention provides a method for determining the best value for the flow rate of the conditioning agent through the valve 36 and the injectors 34, to mix with the flue gas stream 20. FIG. 2 illustrates the basis for the approach. FIG. 2 is a graph of the power P in kilowatts flowing in the electrostatic precipitator 40 from the electrodes 42 to the plates 44, which can be viewed as the power consumed by the precipitator 40, as a function of the flow rate F of the preferred sulfur trioxide conditioning agent in parts per million of the gas stream 20, by volume. Power is defined as the product of the current and the voltage, but since the voltage may remain approximately constant during any particular operating period, current flow is an alternative acceptable measure in some cases. The flow rate F is the total mass flow rate of conditioning agent divided by the total mass flow rate of the gas stream 20, and is such can be viewed as a normalized flow rate.

Since the mechanism of the formation of the dust layer 46 is through electrical charge conduction, the power consumption of the electrostatic precipitator 40 measures the effectiveness of the collection of particulate matter by the precipitator. Up to a point, the larger the power consumed, the more particulate matter is collected in the layer 46.

In a region 60 of FIG. 2, the functional relationship shows that increasing the sulfur trioxide flow results in increased power consumption, as desired. However, above a branching point 62, there may be either of two different behaviors, depending upon a number of factors, such as type of precipitator, gas flow rate, type of fuel being burned, etc. On a first branch 64, increasing the sulfur trioxide flow rate results in decreased power consumption. The first branch behavior is often observed for high gas velocities across the precipitator face, where precipitated material is blown away. On a second branch 66, increasing the sulfur trioxide flow rate results in increasing power consumption. Second branch behavior is sometimes observed for low velocities of gas across the precipitator face, for example.

It is not possible to predict with certainty which branch will be followed for any particular electrostatic precipitator and operating conditions. If, for example, the boiler 12 operates at a low generation level, the functional relationship may follow the second branch 66. At a later time, if the boiler 12 is operated at a high generation level, the functional relationship may shift to the first branch 64. The approach of the present invention provides for a stable, near-optimal injection of conditioning agent, regardless of the nature of the system behavior.

To avoid the instability resulting from such shifting behavior, while attaining a high level of precipitator power consumption, the conditioning agent is introduced at a flow rate near to, but slightly below, that corresponding to a maximum point 68 in the first branch curve 64. A desired operating range 70 is slightly less than the maximum point 68, to avoid the inherent instability resulting from the separation between the first branch 64 and the second branch 66.

The slope or derivative of the functional relationship between power consumption P and flow rate of conditioning agent F, dP/dF, has been selected as the basis for controlling the flow rate of the conditioning agent. Because the value of P decreases to the right of the maximum point of the first branch curve 64, the use of the functional value of P as a function of F (as distinct from the derivative) runs the risk of producing ambiguous results. Thus, attempting to control the conditioning agent flow based upon a preselected value of power consumption or upon maximizing the power consumption can lead to control system error. The derivative, however, when properly used is without ambiguity.

The derivative dP/dF of the functional relationship between P and F, at an operating point within the operating range 70, is represented by a line 72. If the value of dP/dF is specified to be a preselected, small positive number (or, more generally, to be a small positive value within a specified operating range defined by numerically positive values of the slope, with zero considered to be within the range of positive numbers for this purpose), there is no ambiguity as to its associated flow rate F or its functional relation within the region 60 or on either branch 64 or 66.

Stated operationally, if the derivative dP/dF is greater than the preselected operating range, then the value of F is to the left of the operating range 70, and the flow rate of conditioning agent must be increased to bring the system back to the operating point and operating range. Conversely, if the derivative dP/dF is less than the preselected operating range, then the system may be operating either on the second branch 66 if the derivative is slightly less than the operating range, or on the first branch 64 if the derivative is much less than the operating range, or less than zero. In either of these cases, however, it is known with certainty that the flow rate F must be decreased to bring the system back to the desired operating range 70.

The operating point of the first derivative dP/dF and the operating range are selected empirically for any particular power plant operation. In a typical operating case, presented by way of example and not limitation, the desired value for the derivative dP/dF might be 0.05 kilowatts of power per part per million of the conditioning gas. The operating range in this case might be selected as from zero to 0.10 kilowatts per part per million.

The principal complicating factor in this analysis is that the power level P may not respond instantaneously to changes in the conditioning agent flow rate F, and in fact there may be a lag time of up to several hours between a change in F and a responsive change in P. However, this phenomenon is taken into account by a delay time used in pairing F values with P values. That is, one may use the F value measured at an earlier time in conjunction with a currently measured value of P. The time difference between the taking of the F measurement and the P measurement then becomes the delay or lag time for the computation. To introduce the delay time into the computations, a chain rule derivative approach is used.

Further in accordance with the invention, a method for controlling the flow of a conditioning agent added to a flue gas stream prior to the flue gas stream entering an electrostatic precipitator comprises the steps of measuring a derivative dF/dt of a flow rate F of the conditioning agent into the flue gas as a function of time t, at a first time $t_1$; measuring a derivative dP/dt of an electrostatic precipitator power consumption P as a function of time t, at a second time $t_2$; and controlling the flow rate of the conditioning agent such that the first derivative of the power consumption as a function of the flow rate of the conditioning agent, dP/dF, is within a preselected operating range, the step of conditioning including the substeps of determining a measured value of dP/dF by dividing dP/dt by dF/dt, comparing the measured value of dP/dF with the preselected operating range, adjusting the flow rate F as necessary so as to maintain the value of dP/dF within the preselected operating range, the value of F being reduced if dP/dF is less than the preselected operating range and increased if dP/dF is greater than the preselected operating range.

Figure 3:
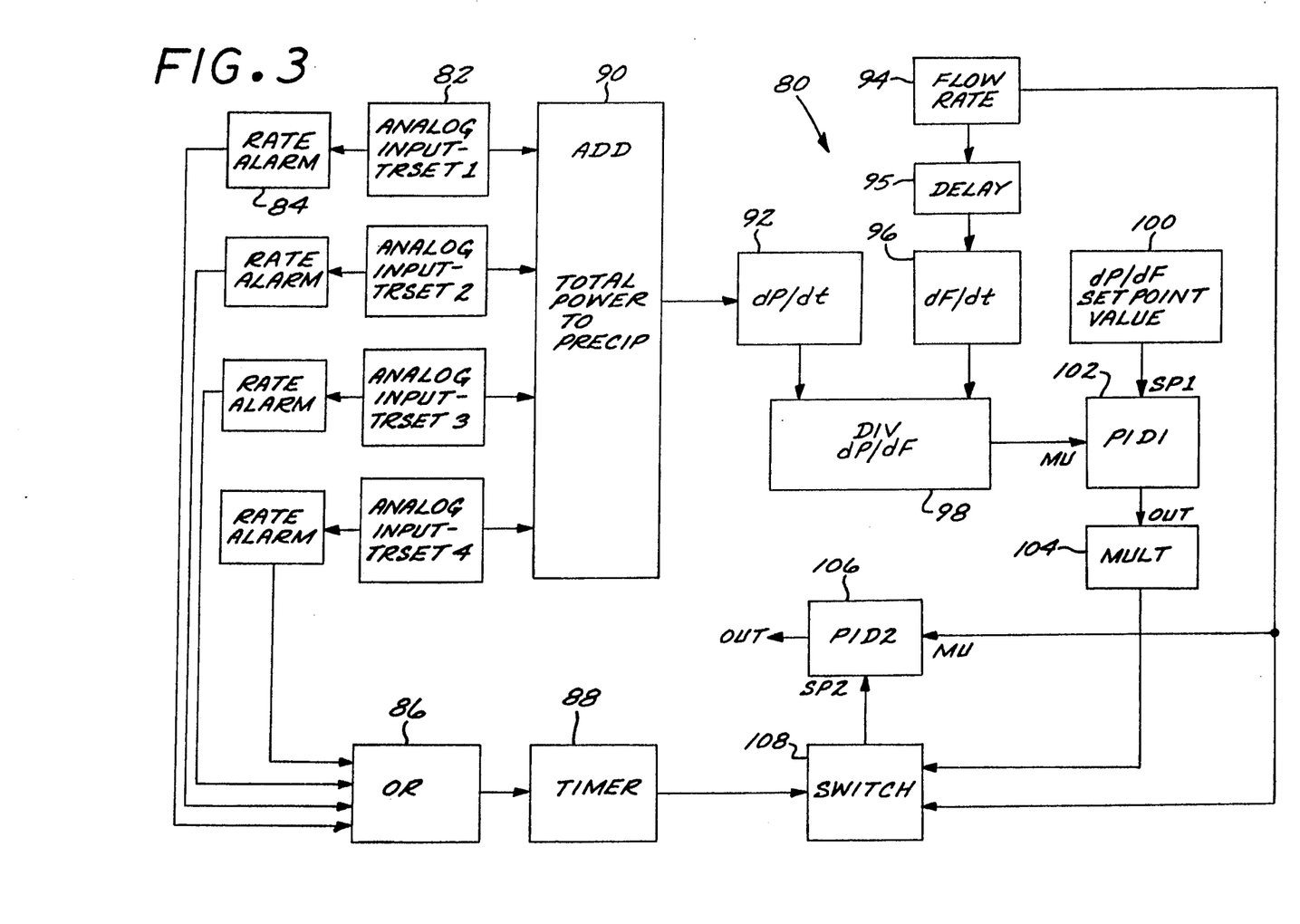
FIG. 3 is a block diagram for the control approach of the invention.

A controller 80 that controls the flow rate F of the conditioning agent is illustrated in FIG. 1 in relation to the other components of the system, and in detail in FIG. 3. Four analog inputs 82 of power consumption from individual pairs of electrodes 42 and plates 44 are provided to the controller 80 from the precipitator controller 48. (Four analog inputs are illustrated in FIG. 3, but lesser or greater numbers may be used in particular operating conditions.) These analog inputs 82 are used in two ways. First, they are provided to a rate alarm 84 that senses whether the individual input 82 has changed status, that is, has gone out of service or entered service. The individual outputs of the rate alarms 84 are logically OR'd in OR function 86 to signal whether any of the individual analog inputs has changed status. If so, then a timer 88 activates a switch block 108 to output a value equal to the measured flow rate F for a pre-selected time period. The output of the switch block 108 is the setpoint to the controller to be described subsequently.

The analog inputs 82 of the power consumption P are also added together at adder 90 to obtain a total instantaneous power consumption of the electrostatic precipitator. The adder 90 may be programmed to add together all of the analog inputs 82, as illustrated, or only some portion or grouping of the analog inputs 82. For example, it may be known from prior experience with a particular power plant that some group of analog inputs 82 is most quickly and strongly indicative of total precipitator performance, or that analog inputs corresponding to a particular region of the precipitator provide the best tracking of overall performance. In another example, if one of the precipitator power supplies has just been started up, its analog input values may reflect a transient condition, and its inclusion in the calculations might distort the results. In that case, that particular analog value could be excluded for a period of time to permit steady state operation to be achieved. The approach of the invention provides sufficient computational flexibility to take such information into account in developing the control parameters of the system.

The derivative of the power P with time t, dP/dt, is calculated by a differentiator 92. This differentiation takes place over a period of time, and a moving average derivative may be used. It is important to understand gross changes of power consumption as a result of changes in operating conditions and conditioning gas, not short term changes that might occur from local fluctuations. While a power plant is a large piece of apparatus and structure, it can undergo short term fluctuations. If the controller were permitted to adjust to each short term fluctuation, it would tend to oscillate widely. Instead, overall performance averaged over time periods of minutes or hours is used.

The current measured flow rate of the conditioning agent relative to the flow rate of the gas stream, the rate F in parts per million shown at numeral 94, is obtained from measuring instrumentation in the source 32 and/or the valve 36. As noted previously, experience may show that the current power consumption may be a result of a flow rate of conditioning agent that occurred some time previously, and therefore a delay 95 is provided. That is, the value of F used in a calculation may be that obtained at time $t_1$ and the value of P that obtained at time $t_2$. $t_1$ and $t_2$ may be same, or $t_1$ may be earlier than $t_2$. In one approach, values of F and P are measured and stored in a memory, a running time average of each is calculated to avoid short term fluctuations, and these averages are stored. The appropriate derivatives may then be calculated, as described below.

The delay time used in selecting values varies with the configuration of each power plant and its operating conditions, and no fixed value can be stated. Delay time information is developed during initial operating trials of the power plant and the controller 80. The delay time values for particular operating conditions and changes in operating conditions are then refined with continued experience, using the information stored in the manner discussed above.

The derivative of the flow rate F of the conditioning agent with time t, dF/dt, is determined by a differentiator 96 of the same general type as differentiator 92. The current measured value of dP/dF is found by dividing dP/dt by dF/dt at divider 98. As discussed previously, the value of dP/dF is the local slope of the curve of FIG. 2, and is the fundamental basis for control.

The value of dP/dF is compared with a setpoint value, the preselected operating range 100, in a proportional integral derivative calculation 102, whose output is a measure of the degree of deviation between the measured value of dP/dF and the operating range 100. This output is supplied to a scaling multiplier 104. The output of the multiplier 104 is then supplied through the switch block 108 as the set point to a second proportional integral derivative calculation 106. (As described previously, alarm conditions cause the setpoint of 106, produced by the switch block 108, to be set equal to the measured value of flow rate for a pre-selected time period.) The other input to this calculation 106 is the measured value of the flow rate 94. The output of the calculation 106 is a signal that controls whether the valve 36 should open further to introduce more conditioning agent to the stream 20, or close down to restrict the flow of the conditioning agent. If the derivative dP/dF is smaller than the operating range, then F is decreased, and if the derivative dP/dF is greater than the operating range, F is increased. The amount by which F is changed may be in linear or nonlinear proportion to the value of dP/dF, or may be an externally preset constant amount.

The particular operating range for a power plant is also determined for the plant and particular operating conditions, and no fixed value can be specified. The operating range of the derivative dP/dF is preferably as narrow as possible, and the absolute value of dP/dF is also as small as possible while maintaining stability of the system. Instability is judged by whether P values fluctuate between values on the first and second branches. If such fluctuations are observed, then the absolute value of the operating range is adjusted to a slightly higher value, and the observations are repeated. A stable operating range of dP/dF is eventually reached, and the controller 80 operates about that point. Thus, a well-defined set of system evaluations is used to determine the control parameters used in the control system of the invention for each power plant.

The controller 80 can be implemented entirely by a digital computer (after converting analog inputs to digital form), or by dedicated circuit components, or by a combination of the two. In the preferred embodiment, the logical and mathematical manipulations of the digitized analog inputs are performed by a digital microprocessor. That is, the procedures of the preferred embodiment illustrated in relation to FIG. 3 are performed by the microprocessor, in the manner described previously.

An important advantage of implementing the functions of the controller 80 with a microprocessor is that the experience gained during operation of a power plant can be integrated into the basic operating algorithm so that the system becomes fully automatic. For example, experience gained during initial and ongoing operations can be used to adjust the control values in particular operating ranges, to minimize the time required to reach a new optimal performance after a change in power plant operating conditions such as boiler load or type of coal being used. Thus, if the power plant output, such as indicated by boiler load, is to be increased from 80 to 90 percent of maximum power over a period of several hours, then the prior experience gained from such changes performed previously is used to estimate the flow rate of conditioning agent required at the higher power output. The controller makes a coarse adjustment based upon the estimate, and then uses the procedures described herein to make fine adjustments to optimize the injection of conditioning agent.

Figure 4:
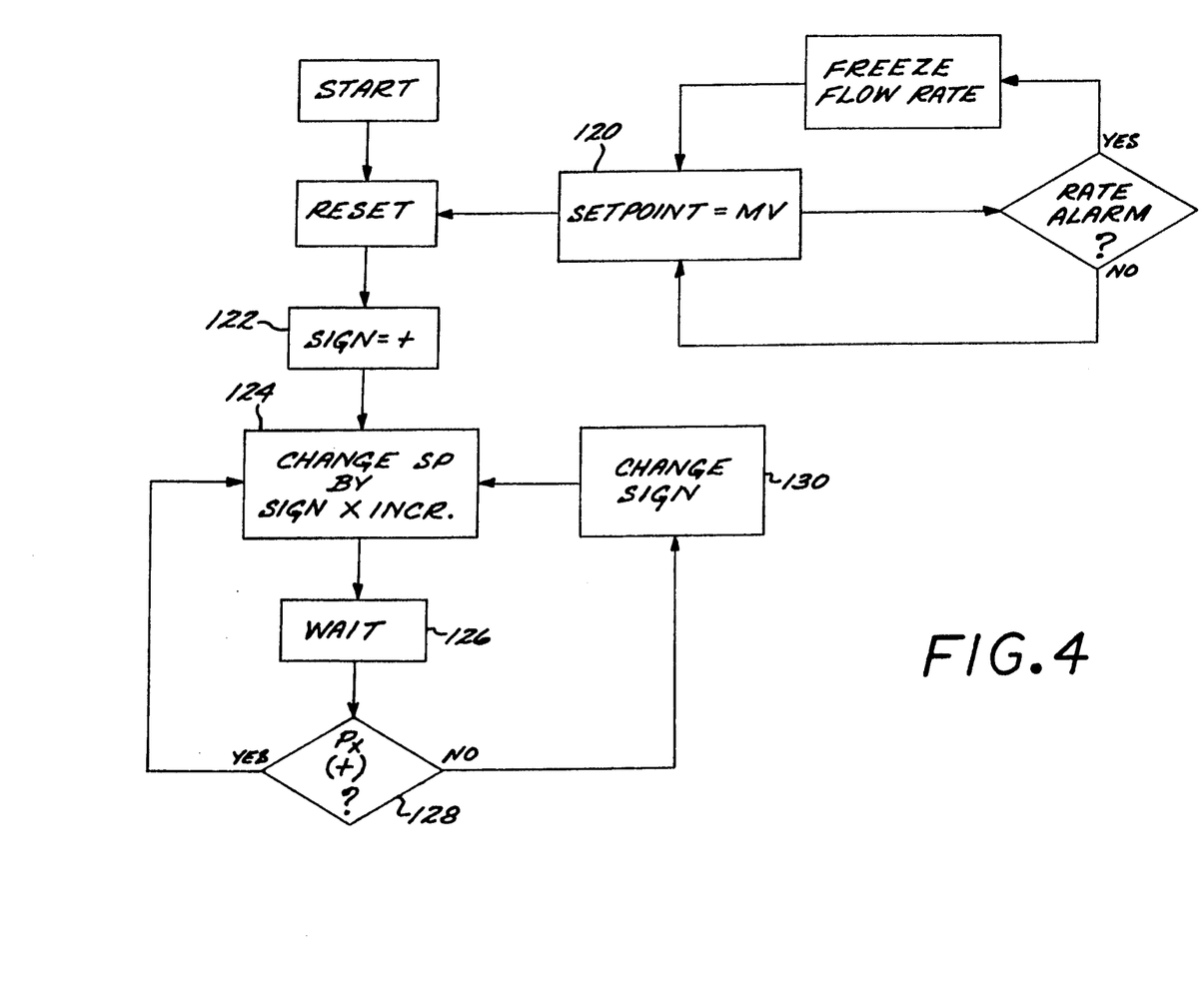
FIG. 4 is a block diagram for the control logic of an alternative control approach.
Figure 5:
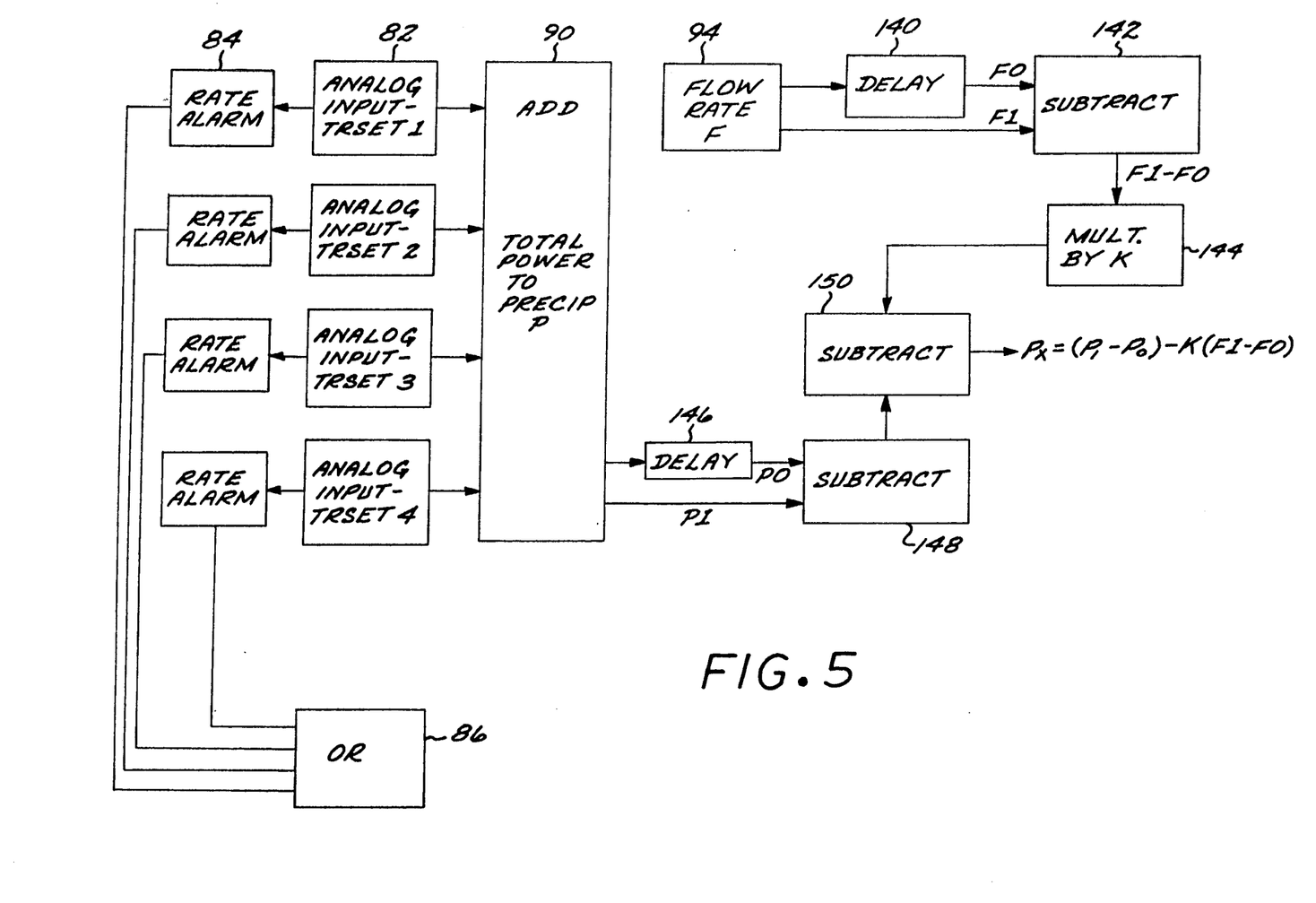
FIG. 5 is a block diagram for the control value determination of the alternative control approach.

An alternative control scheme is illustrated in FIGS. 4 and 5. As with the the prior approach, the procedure of FIGS. 4 and 5 maintains the mathematical first derivative of power consumption P with conditioner mass flow rate F, dP/dF, within a preselected operating range. In this case, however, the control scheme is based upon a direct incremental variation or perturbation approach and determination of the change in the next increment.

The general control logic for the alternative approach is illustrated in FIG. 4. The setpoint for the flow rate F is initially set at a measured value MV at block 120. The flow rate is then changed by an amount equal to SIGN(INCR), where "SIGN" is plus (+) or negative (−) and "INCR" is a preselected flow rate incremental change. For example, the increment INCR might be selected to be 1 part conditioning agent per million parts flue gas (i.e., 1 ppm). The SIGN attached to INCR is determined by an analysis of the effects of a prior change, and can be plus (+), indicating an increase, or minus (−), indicating a decrease. A +(INCR), where INCR is 1 ppm, signifies that, whatever the flow rate F is at the moment, it is to be increased by 1 ppm in the next control cycle. A −(INCR), that is with a minus sign, means that the flow rate F at that moment is to be decreased by 1 ppm for the next control cycle. The value of SIGN is determined by the control logic of FIG. 4, as will be described. The value of "INCR", i.e., 1 ppm, 2 ppm, etc., is initially selected based upon experience, but may subsequently be adjusted in proportion to the value of the $P_x$ measurement described hereafter. The smaller the value of INCR, the longer it will take to reach a near-optimum flow rate, but the smaller the swings about that near-optimum flow rate when it is reached.

Initially, the sign is set positive, block 122. For a first control cycle, the set point SP of the flow rate F is +INCR so that the flow rate is increased by the amount of INCR, block 124. There is a waiting time, block 126, to permit the effect of the change in the flow rate F to propagate through the system. Then a value $P_x$ is calculated and tested, block 128. (The calculation of $P_x$ will be discussed below in relation to FIG. 5.) If the value of $P_x$ is positive, in the next control cycle the sign remains unchanged and the set point is again changed in the same direction as in the prior control cycle. On the other hand, if the value of $P_x$ is negative, in the next control cycle SIGN is changed from its prior value, block 130, and the set point is changed by the value of (SIGN)(INCR). For example, if in some control cycle the value of SIGN was positive and $P_x$ is determined to be negative, then on the next control cycle the value of SIGN becomes negative.

The value of $P_x$ is an indicator of the location of the system in relation to the various possibilities previously indicated in relation to FIG. 1. If $P_x$ is positive, the prior change in set point of the conditioning agent flow rate F was in the proper direction to move the system toward the operating range 70. If $P_x$ is negative, the prior change in set point was in the wrong direction to move the system toward the operating range 70, and the next increment must be reversed. A zero value of $P_x$ means that the system is within the proper operating range and at the preferred operating point. In this case of a zero value of $P_x$, there are several options. In the preferred approach illustrated in FIG. 4, SIGN is changed to establish a perturbation about the preselected operating point of F. Alternatively, SIGN could be maintained the same to drive the value of F past the preferred operating point until the system was moved to the extremum of the operating range. In another alternative, a further change in SP could simply be deferred for some period of time. The preferred approach establishes an oscillation about the preferred operating point, in the preselected operating range.

Referring to FIG. 5, a precipitator power level P is established using the same approach of analog inputs 82, rate alarms 84, OR function 86, and adder 90 as discussed previously. A flow rate F is measured in the same manner previously described, block 94.

Operationally, a change in flow rate F occurs according to block 124 of FIG. 4. The initial flow rate before the change is made $F_o$ is measured and stored, block 140. At a later time after a time delay $D_1$, the current flow rate $F_1$ is measured, as indicated at block 94. The difference $F_1 - F_0$ is calculated in a subtraction 142, and then multiplied by a constant K in a multiplication 144. K is a constant, preselected value equal to the desired slope dP/dF at the desired operating point within the operating range 70.

In a similar manner, the initial precipitator power before the change is made $P_0$ is measured and stored, block 146. At a later time after a time delay $D_2$, the current precipitator power $P_1$ is measured, as indicated at block 90. ($D_1$ is often chosen to be the same as $D_2$, but can be made different to account for system lag effects as discussed previously.) The difference $P_1 - P_0$ is calculated in a subtraction 148.

The value of $P_x$ is calculated as $$P_x = (P_1 - P_0) - K(F_1 - F_0)$$

at subtraction 150. It is this value of $P_x$ that is used at block 128 of the logic of FIG. 4. In performing the above calculation, the values of power $P_1$ and $P_0$ and the values of flow rate $F_1$ and $F_0$ may be, and usually are, determined as averages calculated over time periods which are short compared to the delay times, but are sufficiently long to eliminate short term fluctuations.

During the operation of the power plant, the effect on power of additions of conditioning agents is as depicted in FIG. 1, the exact effect being dependent upon the location of F and the effective curve branch. If F is to the left of the operating range 70, any change in P, responsive to either a positive or negative change in F, will cause the value of F to be increased. The flow rate F is therefore forced toward that corresponding to the operating range 70. If, on the other hand, F is to the right of the operating range 70, any change in P, responsive to either a positive or negative change in F and regardless of whether the first or second branch is effective, will cause the value of F to be decreased. The flow rate F is thereby forced toward that corresponding to the operating range 70. In each case, the system is stable and converging toward the near-optimum value of F within the preselected operating range that produces a near-optimum value of precipitator power P.

The present invention provides a reliable, reproducible approach to controlling the flow of a conditioning agent such as sulfur trioxide for introduction to a flue gas stream. Control is based upon the feedback of precipitator operating parameters, which are then optimized in a closed loop fashion. Although a particular embodiment of the invention has been described in detail for purposes of illustration, various modifications may be made without departing from the spirit and scope of the invention. Accordingly, the invention is not to be limited except as by the appended claims.

What is claimed is:

1. A method for controlling the flow rate of a conditioning agent in a flue gas conditioning operation to enhance the efficiency of an electrostatic precipitator, comprising the steps of:

adding a quantity of conditioning agent to the flue gas stream, before it enters the electrostatic precipitator, at a mass flow rate F;

measuring the electrostatic precipitator power consumptions $P_2$ and $P_1$ at respective flow rates $F_2$ and $F_1$;

detecting the actual slope of the power consumption curve relative to flow rate during relatively steady state conditions of power consumption relative to time, using the formula:

$$\frac{P_2 - P_1}{F_2 - F_1}$$

where
$F_2$ = a second flow rate
$F_1$ = a first flow rate
$P_2$ = measured power consumption at $F_2$
$P_1$ = measured power consumption at $F_1$; and selectively controlling the flow rate F in relation to the power consumption P such that said slope is within a preselected operating range.

2. The method of claim 1, wherein the step of controlling establishes a flow rate F such that the formula yields a positive number.

3. The method of claim 1, wherein the conditioning agent is sulfur trioxide.

4. The method of claim 3, wherein the step of controlling includes the substeps of:

increasing the flow rate F of the conditioning agent if the formula yields a ratio greater than in the preselected range; and decreasing the flow rate F of the conditioning agent if the formula yields a ratio less than in the preselected range.

5. The method of claim 4, including, prior to the step of controlling, introducing a predetermined time delay into the measurement of power consumption, so that the value of the flow rate F utilized in the step of controlling is that measured prior to the value of power consumption P utilized in the step of controlling, by the amount of the time delay.

* * * * *